US012663349B2

(12) United States Patent
Han et al.

(10) Patent No.: US 12,663,349 B2
(45) Date of Patent: Jun. 23, 2026

(54) METHOD FOR ESTIMATING DISSOLUTION OF SALT

(71) Applicant: ARAMCO SERVICES COMPANY, Houston, TX (US)

(72) Inventors: Yanhui Han, Houston, TX (US); Younane Abousleiman, Norman, OK (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 342 days.

(21) Appl. No.: 18/459,158

(22) Filed: Aug. 31, 2023

(65) Prior Publication Data

US 2025/0076172 A1    Mar. 6, 2025

(51) Int. Cl.
*G01N 13/00* (2006.01)

(52) U.S. Cl.
CPC ....... *G01N 13/00* (2013.01); *G01N 2013/006* (2013.01)

(58) Field of Classification Search
CPC .................... G01N 13/00; G01N 2013/006
See application file for complete search history.

(56) References Cited

U.S. PATENT DOCUMENTS

| | | | | |
|---|---|---|---|---|
| 2011/0250582 A1* | 10/2011 | Gates | ..................... | C09K 8/582 |
| | | | | 435/286.1 |
| 2013/0333882 A1* | 12/2013 | Stukan | .................... | E21B 47/10 |
| | | | | 166/252.5 |
| 2014/0186119 A1* | 7/2014 | Dusseault | ........... | E21B 41/0064 |
| | | | | 405/129.2 |

FOREIGN PATENT DOCUMENTS

| | | | | | |
|---|---|---|---|---|---|
| CN | 109239307 A | | 1/2019 | | |
| CN | 110096824 A | * | 8/2019 | ............. | G06T 17/05 |
| WO | WO-2024218368 A1 | * | 10/2024 | ............. | F24T 10/30 |

OTHER PUBLICATIONS

Engvall, Luke Houlden, Timothy J. O'Hern, and David L. Lord. Experimental characterization of temperature dependence of salt dissolution rate. No. SAND2013-2398C. Sandia National Lab.(SNL-NM), Albuquerque, NM (United States), 2013 (Year: 2013).*

O'Hern, Timothy J., David Lord, and David Keith Rudeen. Experiments to Determine Salt Dissolution Rate as a Function of Brine Properties. No. SAND2014-19641C. Sandia National Lab.(SNL-NM), Albuquerque, NM (United States), 2014 (Year: 2014).*

Wang, Jinchao, et al. "Simulation of flow field of solution mining salt cavities for underground gas storage." Journal of Energy Resources Technology 145.2 (2023)—online published 2022: 022001. (Year: 2023).*

(Continued)

*Primary Examiner* — Fatemeh Esfandiari Nia
(74) *Attorney, Agent, or Firm* — Osha Bergman Watanabe & Burton LLP

(57)    ABSTRACT

A method of estimating dissolution progress of a salt in construction of a salt cavern includes: defining, for each of a plurality of parameters, an operable range of respective parameter and an average value of the operable range of respective parameter; performing a plurality of flooding tests, by varying one particular parameter among the plurality of parameters from a lowest value to a highest value in the operable range of the one particular parameter and keeping all other parameters at the average value of respective parameter; and obtaining an analytical relationship of a mass of dissolved salt versus the one particular parameter.

8 Claims, 5 Drawing Sheets

$$M = D_2 g(\omega)$$

(56)         References Cited

OTHER PUBLICATIONS

Li, Peng, et al. "Stability analysis of U-shaped horizontal salt cavern for underground natural gas storage." Journal of Energy Storage 38 (2021): 102541. (Year: 2021).*

Deng, J. Q., Q. Yang, and Y. R. Liu. "Time-dependent behaviour and stability evaluation of gas storage caverns in salt rock based on deformation reinforcement theory." Tunnelling and underground space technology 42 (2014): 277-292. (Year: 2021).*

Li, Jinlong, et al. "Mathematical model of salt cavern leaching for gas storage in high-insoluble salt formations." Scientific reports 8.1 (2018): 372. (Year: 2018).*

R. W. Durie et al., "Mechanism of the Dissolution of Salt in the Formation of Underground Salt Cavities" Society of Petroleum Engineers Journal, University of Texas, Jun. 1964, pp. 183-190 (8 pages).

Warren, J.K., 2016. Evaporites: A geological compendium. Springer (9 pages).

Lux, K.H., 2009. Design of salt caverns for the storage of natural gas, crude oil and compressed air: Geomechanical aspects of construction, operation and abandonment. Geological Society, London, Special Publications, 313(1), pp. 93-128 (36 pages).

* cited by examiner

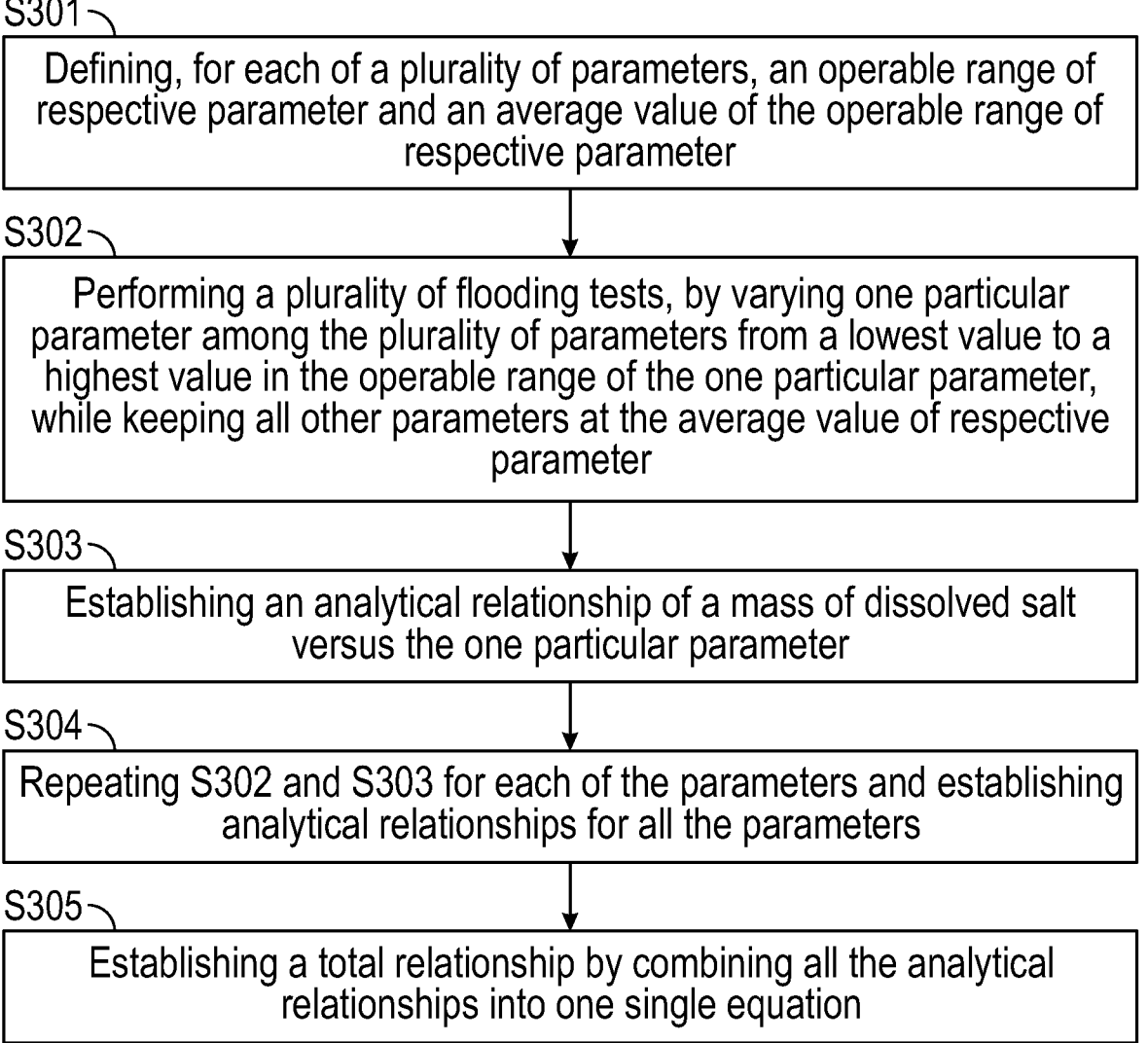

S301

Defining, for each of a plurality of parameters, an operable range of respective parameter and an average value of the operable range of respective parameter

S302

Performing a plurality of flooding tests, by varying one particular parameter among the plurality of parameters from a lowest value to a highest value in the operable range of the one particular parameter, while keeping all other parameters at the average value of respective parameter

S303

Establishing an analytical relationship of a mass of dissolved salt versus the one particular parameter

S304

Repeating S302 and S303 for each of the parameters and establishing analytical relationships for all the parameters

S305

Establishing a total relationship by combining all the analytical relationships into one single equation

FIG. 3

METHOD FOR ESTIMATING DISSOLUTION OF SALT

BACKGROUND

Hydrogen is used in various applications that range from chemical industry, transportation fuel, and storing energy, and needs to be stored in these applications, especially when used as an energy source or an energy storage medium. Storage of hydrogen underground may be useful in the storage of energy for stabilizing power grid output in the operation of intermittent energy sources, such as solar or wind power, as well as providing fuel for electricity generation and for transportation. However, storing hydrogen typically requires a large volume. For example, hydrogen is a low-density material, and 1 kg of hydrogen gas occupies over 11 m$^3$ at atmospheric pressure and room temperature. This means that storage for a large amount of hydrogen necessarily requires a large volume under these conditions.

Salt caverns have been used as strategic petroleum reserve (SPR) for oil and gas storage and extraction. As an awareness of climate change increases, hydrogen economy starts to develop and salt caverns are identified as a feasible and flexible solution within the hydrogen economy for hydrogen storage and extraction. Given the salt formation ability in space and geometry, salt caverns may potentially be used for energy available hydrogen storage and extraction as a part of distribution grid or energy network. Compared to hydrogen storage and extraction in sedimentary reservoir system (for example, saline aquifer, depleted oil, and gas reservoirs), salt caverns may show advantages in excellent sealing capacity for short and/or long term hydrogen storage, flexibility for hydrogen or hydrogen/energy fluid components to be extracted with little or no hydrogen components losses due to dilution or migration in a typical sedimentary reservoir system. As such, there exists a need to better understand salt caverns for hydrogen storage and extraction.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some aspects, the techniques described herein relate to a method of estimating dissolution progress of a salt in construction of a salt cavern, including: defining, for each of a plurality of parameters, an operable range of respective parameter and an average value of the operable range of respective parameter; performing a plurality of flooding tests, by varying one particular parameter among the plurality of parameters from a lowest value to a highest value in the operable range of the one particular parameter and keeping all other parameters at the average value of respective parameter; and obtaining an analytical relationship of a mass of dissolved salt versus the one particular parameter.

In some aspects, the techniques described herein relate to a method, wherein each of the flooding tests is performed by: injecting a dissolving fluid into the salt disposed in a core flooding apparatus, producing a brine containing dissolved salt; and calculating the mass of the dissolved salt in the brine.

In some aspects, the techniques described herein relate to a method, wherein the analytical relationship is obtained by fitting a curve of the flooding tests in the operable range of the one particular parameter.

In some aspects, the techniques described herein relate to a method, further includes using the analytical relationship to estimate the dissolution progress of the salt.

In some aspects, the techniques described herein relate to a method, further including controlling, using the analytical relationship, a shape and/or a size of the salt cavern during the construction of the salt cavern.

In some aspects, the techniques described herein relate to a method, further including estimating a stability of the salt cavern using the analytical relationship.

In some aspects, the techniques described herein relate to a method, further including performing the flooding tests for each of the parameters and obtaining a plurality of the analytical relationships for each of the parameters.

In some aspects, the techniques described herein relate to a method, further including combining the plurality of the analytical relationships to obtain a total relationship between the mass of dissolved salt and all of the parameters.

In some aspects, the techniques described herein relate to a method, further including controlling, using the total relationship, a shape and/or a size of the salt cavern during the construction of the salt cavern.

In some aspects, the techniques described herein relate to a method, further including estimating a stability of the salt cavern using the total relationship.

In some aspects, the techniques described herein relate to a method, wherein the plurality of parameters is selected from a group consisting of flow rate, temperature, pressure, injection frequency, and composition of a dissolving fluid.

In some aspects, the techniques described herein relate to a method for constructing a salt cavern, including: injecting a dissolving fluid into a salt formation, producing a brine containing dissolved salt; and controlling a plurality of parameters during the injecting to control a shape and/or size of the salt cavern, based on analytical relationships between a mass of dissolved salt and each of the parameters, wherein each of the analytical relationships for respective parameter is obtained by: defining, for each of the plurality of parameters, an operable range of respective parameter and an average value of the operable range of respective parameter; performing a plurality of flooding tests, by varying one particular parameter among the plurality of parameters from a lowest value to a highest value in the operable range of the one particular parameter and keeping all other parameters at the average value of respective parameter; and obtaining an analytical relationship of a mass of dissolved salt versus the one particular parameter.

In some aspects, the techniques described herein relate to a method, wherein the analytical relationship is obtained by fitting a curve of the flooding tests in the operable range of the one particular parameter.

In some aspects, the techniques described herein relate to a method, further includes using the analytical relationships to estimate a dissolution progress of the salt.

In some aspects, the techniques described herein relate to a method, further including estimating a stability of the salt cavern using the analytical relationships.

In some aspects, the techniques described herein relate to a method, further including performing the flooding tests for each of the parameters and obtaining a total relationship between the mass of dissolved salt and all of the parameters by combining the plurality of the analytical relationships.

In some aspects, the techniques described herein relate to a method, further including estimating a stability of the salt cavern using the total relationship.

In some aspects, the techniques described herein relate to a method, wherein the plurality of parameters is selected from a group consisting of flow rate, temperature, pressure, injection frequency, and composition of a dissolving fluid.

Other aspects and advantages of the claimed subject matter will be apparent from the following description and the appended claims.

BRIEF DESCRIPTION OF DRAWINGS

FIG. 3 shows a method for estimating a dissolution of salt mass in a gas storage system according to one or more embodiments.

DETAILED DESCRIPTION

Figure 1:
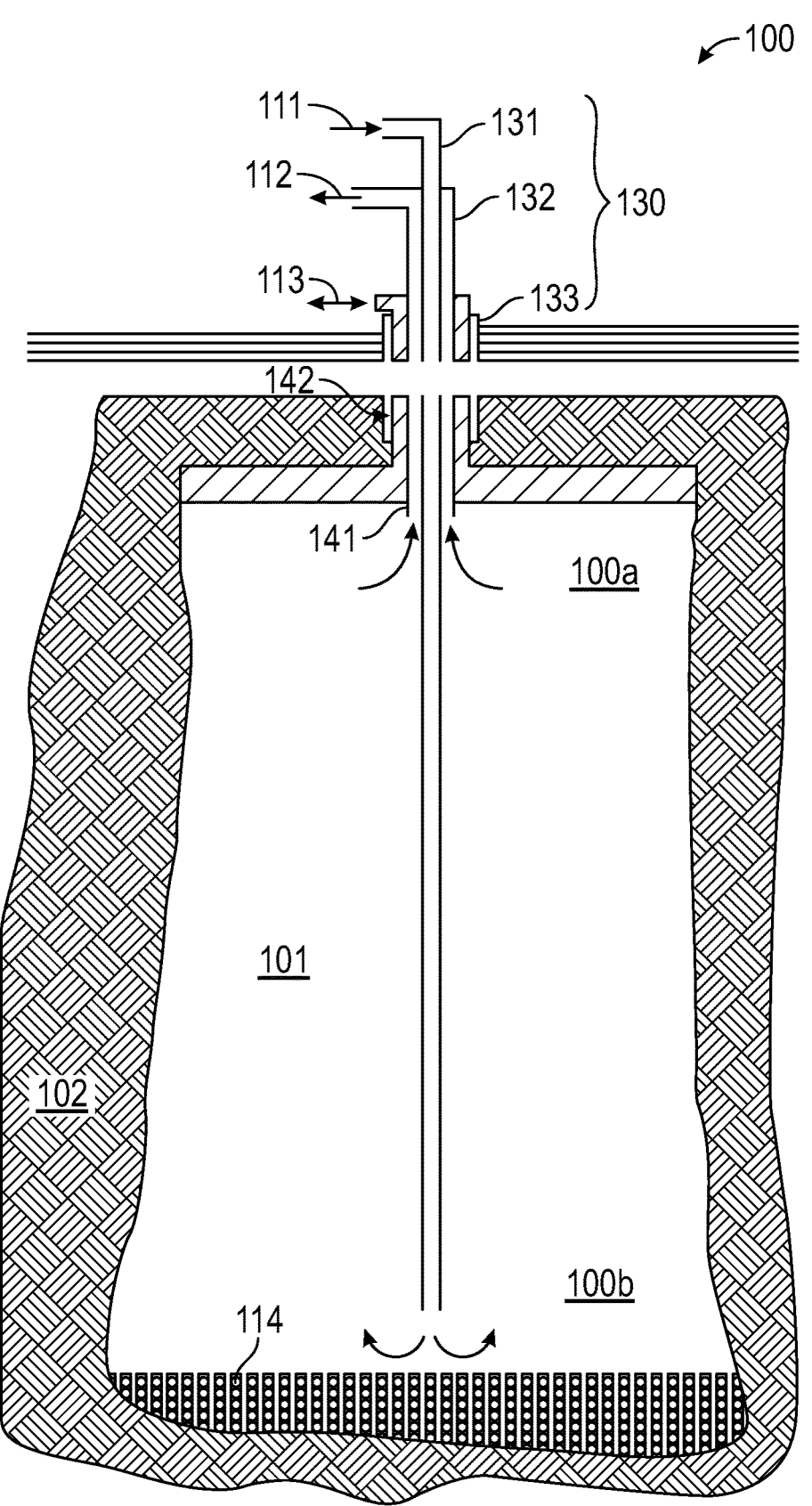
FIG. 1 shows a gas storage system according to one or more embodiments.

Salt caverns have been used as strategic petroleum reserve (SPR) for oil and gas storage and extraction. When constructed for strategic long-term storage of oil and natural gas within the SPR caverns networks, the stability and integrity of salt caverns walls and long-term sustainability of salt caverns are not at stake since a frequency of injection and extraction is scarce for oil and natural gas, for example, less than once a year. However, if hydrogen is to be used as an integral part of the energy grid or network, for yearly or seasonal electricity generation, or used for large vehicles (such as trucks) and as a transportation fuel including marine transportation ships, a frequency of injection and extraction for hydrogen, cushion gases, or fluids will become extremely important, because constant or high frequency movements of gases and fluids on solid surfaces will affect surface integrity, such as stiffness, of the internal walls of salt caverns. A cushion gas refers to a certain amount of gas that is permanently stored and must remain in a salt cavern to help maintain its shape and prevent collapse. Specifically, the cushion gas provides a pressure force on the internal walls of the salt cavern. The amount of required cushion gas depends on the type of storage and conditions of salt caverns. Examples of the cushion gas may include natural gas, nitrogen, carbon dioxide.

One or more embodiments of the present disclosure relates to a gas storage system and a method of estimating a dissolution of salt mass and evaluating a dissolution progress in the gas storage system. The gas storage system may comprise a salt cavern for injection, storage, and extraction of a gas. While hydrogen gas and associated cushion gases or fluids are discussed in one or more embodiments of the present disclosure, it is known to one having ordinary skill in the art that the present disclosure is not limited to the hydrogen gas, and may extend to any gas as long as there exists a need for frequent injection and extraction of the gas stored in the salt cavern.

One or more embodiments of the present disclosure relates to a salt cavern for high frequency injection and extraction of hydrogen and associated cushion gases or fluids. The injection and extraction of hydrogen and associated cushion gases or fluids into the salt cavern may fluctuate an internal pressure, wall temperature and temperature gradients, shear forces of gas or liquid flows onto the wall of the salt cavern geometry, and other macro forces between the flows and the walls with their associated impurities. A frequent internal pressure fluctuation, coupled with in-situ stress disturbances due to a shape, volume, and geometry of the salt cavern, may cause non-sustainable damages, such as large deformations of walls due to fatigue and overtime weakening. As a result, frequent injection and extraction may potentially introduce slow but persistent and progressive damage in and around the walls, which will affect volume storage and evolved geometry or shape of the salt cavern.

Salt formations are rock layers, the plurality of which is comprised of at least one dissolvable salt, for example, sodium chloride or other halite-forming salts. Closer to the surface, above the salt formation, lies an overburden, which is the rock and/or soil that is adjacent to and rests on top of the salt formation. Below the salt formation is the underburden, which is the rock and soil that is adjacent to and lies directly below the salt formation. The underburden is distal to the overburden. The temperature of salt formations useful in embodiments herein may range from 5-50° C., for example, from 10-35° C. in other embodiments, and from 20-25° C. in other embodiments.

A salt cavern is a man-made structure in underground salt formation and is in form of a subsurface cavity generally created by dissolution of salt in deep salt beds and domes by a fluid circulating through a well drilled into underground salt formation. The salt cavern allows very little of the injected gas to escape from storage unless specifically extracted, because the salt formation have low permeability to the stored gas, such as, for example, smaller than 10-3 millidarcy (md), allowing for gas under pressure to remain in the salt cavern for a long period. Low permeability of the salt formation facilitates the storage of gas within a salt cavern produced within them.

In one or more embodiments, the salt cavern may be formed having a shape such as cylindrical, ellipsoid, or capsule. In one or more embodiments, such as salt caverns in bedded salt formations, the salt cavern may have an irregular geometry. The salt cavern may have a diameter or effective diameter from a few to a few hundred meters, for example, ranging from 5 m to 100 m, or from 10 m to 50 m, or from 25 m to 40 m. A depth of the salt cavern from ground surface may range from 100 m to 2000 m, or from 200 m to 1000 m, or from 300 m to 500 m. In one or more embodiments, salt caverns of other dimensions or those produced through other methods may be possible as well. In one or more embodiments, a field of multiple salt caverns in a salt formation may be employed. In one or more embodiments, more than one well may be drilled for a single salt cavern, particularly in the case of salt formations that are more than 500 m thick or in other situations apparent to those skilled in the art. The number of wells may be governed, for example, by the shape and size of the salt cavern.

A volume of the salt cavern that can be produced may depend on an initial size of the salt formation, an amount of gas that is desired to be stored, along with a stability of the salt cavern, or its ability to remain structurally intact over long periods. The salt cavern may have a volume ranging from about 100,000 $m^3$ to about 1,000,000 $m^3$. Larger or smaller volumes are possible in some embodiments. Other embodiments may have volumes from about 200,000 m³ to about 3,000,000 m³. Still other embodiments may have volumes ranging from about 500,000 m³ to about 700,000 m³. The volume, strength of the walls of the salt cavern, and its depth from surface are some parameters that need to be considered in the design of salt caverns.

In one or more embodiments, the salt cavern may be constructed by drilling a well into a salt formation and injecting a dissolving fluid into the salt formation that facilitates dissolution of one or more salts in the salt formation to etch out a large void space and/or cavern. The dissolving fluid may comprise primarily water and optionally other compounds or materials, for example, freshwater or undersaturated brine. The dissolving fluid may be injected into the salt formation multiple times to produce the salt cavern of desired dimensions. After dissolution, a brine is formed comprising the dissolving fluid and dissolved salts. The brine is subsequently removed, leaving behind the salt cavern of a particular size or dimension. The brine may be pumped out to the ground surface where it can be processed to recover desired chemical products or disposed of in a sound and environmentally accepted procedure. A compressed gas, for example compressed air or compressed nitrogen, may be used to remove the dissolving fluid or brine, to remove contaminants, and to prevent collapse of the salt cavern during formation, whereas the compressed gas serves as a cushion gas during salt cavern formation. Insoluble material in the salt formation, such as quartz, anhydrite, and other materials not soluble in the dissolving fluid, may fall to or accumulate at a bottom portion of the salt cavern, or may be removed from the salt cavern along with the brine.

Injection of the dissolving fluid and removal of the brine may be performed using one or more casings and annulus formed between adjacent casings. In one or more embodiments, a plurality of casings may be disposed inside a well extended from above ground surface to a salt formation for salt cavern formation. The casings may include a first casing having a first diameter disposed inside of a second casing having a second diameter larger than the first diameter. A first annulus is formed between the first casing and the second casing. The first casing may have a longer length from the ground surface (that is, deeper into the salt formation) than the second casing. In one or more embodiments, a third casing and its adjacent interior casing provide a second annulus. The first casing may extend to be approximate a bottom portion of the salt cavern, and is deeper than the second casing. The second casing may extend to be approximate to a top portion of the salt cavern, and at the same time, below a roof of the salt cavern. The third casing may extend to be approximate to the top portion of the salt cavern, and at the same time, above the roof of the salt cavern. The dissolving fluid and the brine may be injected and removed through the first casing and the first annulus. The second annulus may be used for injection and removal of a blanket solution, protecting the roof of the salt cavern from dissolving. The blanket solution is a protective fluid that is lighter than water and occupies a space in the uppermost portion of the salt cavern. The blanket solution prohibits leaching of salt from around the cemented casing and assures a pressure tight cavern, prohibits development of high spots from which the stored product could not be removed, and protects the production casing from internal corrosion. Examples of the blanket solution may include natural gas, propane, butane, diesel oil, and crude oil.

FIG. 1 shows a gas storage system 100 according to one or more embodiments. The gas storage system 100 may comprise a salt cavern 101 with direct circulation. The gas storage system may comprise a plurality of casings 130 extending from above ground surface to underground salt formation 102. A bottom end of a first casing 131 extends to a bottom portion 100b of the salt cavern throughout a formation of the salt cavern. A bottom end of a second casing 132 extends to a top portion 100a of the salt cavern. The dissolving fluid 111 may be injected into the salt formation 102 through a top end of the first casing 131, and the brine 112 may be removed from a top end of the first annulus 141 between the first casing 131 and the second casing 132. The dissolving fluid 111 dissolves more salt and thus results in a larger diameter near the bottom portion 100b. Insoluble materials 114 in the salt formation may fall to or accumulate at the bottom portion of the salt cavern.

In one or more embodiments, the gas storage system 100 may further comprise a second annulus 142 allowing injection and removal of a blanket solution 113. The second annulus 142 may be formed between a third casing 133 and an adjacent casing that is interior to the third casing. In one or more embodiments, the third casing may be an outermost casing among the plurality of casings. In one or more embodiments, the second casing is the adjacent casing, and the second annulus is formed between a third casing and a second casing. The blanket solution 113 may be fed into the top portion of the cavern, covering a roof of the salt cavern, so as to separate salt at the roof from the dissolving fluid and prevent the roof from dissolving.

Figure 2:
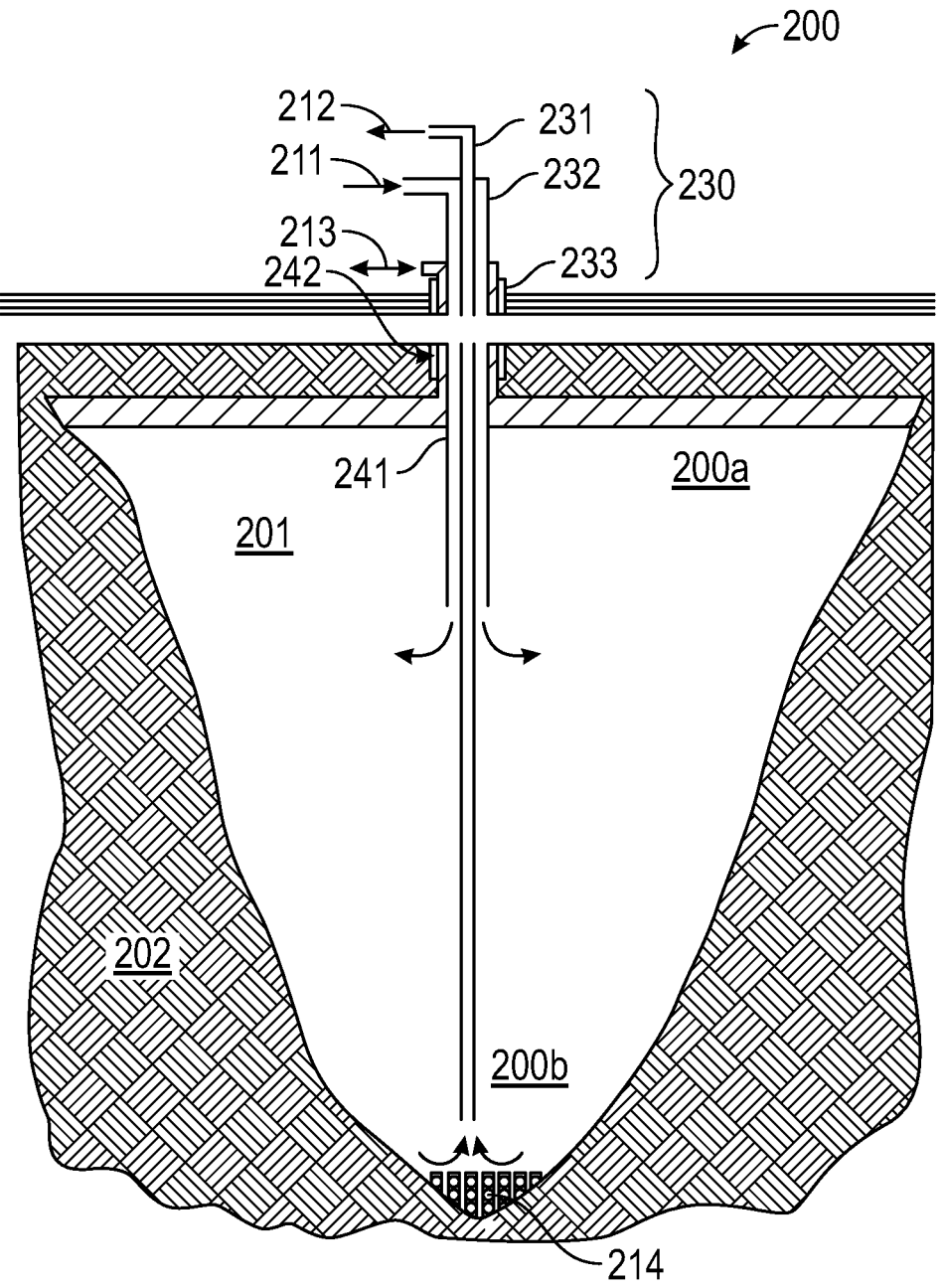
FIG. 2 shows a gas storage system according to one or more embodiments.

FIG. 2 shows a gas storage system 200 according to one or more embodiments. The gas storage system 200 may comprise a salt cavern 201 with reverse circulation. The gas storage system 200 may comprise a plurality of casings 230 extending from above ground surface to underground salt formation 202. A bottom end of a first casing 231 extends to a bottom portion 200b of the salt cavern throughout a formation of the salt cavern. A bottom end of a second casing 232 extends to a top portion 100a of the salt cavern. The dissolving fluid 211 may be injected into the salt formation 202 through a top end of the first annulus 241 between the first casing 231 and the second casing 232, and the brine 212 may be removed from a top end of the first casing 231. The dissolving fluid 211 dissolves more salt and thus results in a larger diameter near the top portion 200a. Insoluble materials 214 in the salt formation may fall to or accumulate at the bottom portion of the salt cavern.

In one or more embodiments, the gas storage system 200 may further comprise a second annulus 242 allowing injection and removal of a blanket solution 213. The second annulus 242 may be formed between a third casing 233 and an adjacent casing that is interior to the third casing. In one or more embodiments, the third casing may be an outermost casing among the plurality of casings. In one or more embodiments, the second casing is the adjacent casing, and the second annulus is formed between a third casing and a second casing. The blanket solution 213 may be fed into the top portion of the cavern, covering a roof of the salt cavern, so as to separate salt at the roof from the dissolving fluid and prevent the roof from dissolving.

As discussed herein, the cavern shape may be determined by an injection location of the dissolving fluid, resulting in different etching speed of salt at different locations in the salt cavern. For example, in one or more embodiments related to direct circulation, the cavern tends to have a cylindrical shape with expanded bottom portion (lower section); or in one or more embodiments related to reverse circulation, the cavern tends to be wider at the top portion (upper section) than the bottom portion. This is because the distributions of flow rate and salt concentration in the dissolving fluid are different in these two circulations. In addition, a volume of the blanket solution may also be varied to help shape the cavern.

The shape and size of the salt cavern are of critical importance to its stability. One or more embodiments disclosed herein provides a strategy for controlling the shape and size of a salt cavern during construction, including study on injection location, injection frequency, flow rate, and salt concentration. Further, one or more embodiments disclosed herein may be applied to discover and quantify relationships between an etching speed of the salt (reflected by a mass of the dissolved salt) and the flow characteristics (e.g., flow rate, frequency) and salt concentration in the dissolving fluid that the salt mass is exposed to. In addition, one or more embodiments disclosed herein may also be applied to predict a dissolution progress and/or a damage of salt mass under cyclic loading and evolution of the salt cavern in long term. After the salt cavern is finished, injection and extraction cycles may continue to impose cyclic loading inside the cavern, which may cause slow but progressive damage in the salt rock mass surrounding the cavern, thus the shape and size of the salt cavern will continue to evolve in time.

FIG. 3 a method according to one or more embodiments. While one embodiment is disclosed, other embodiments of the present invention may be possible, using differing configurations, materials, and method steps readily envisioned by those skilled in the art based on the present description, including for caverns useful for storage of other gases, such as liquefied natural gas, carbon dioxide, or others.

In step S301, a plurality of parameters during dissolution of salt are selected and a plurality of operable ranges are defined respectively for respective parameters. A plurality of average values are calculated respectively for respective operable range of respective parameter. Examples of the parameters may include a flow rate, an confining pressure, a temperature, a salt concentration, chemical additives, and a frequency of loading.

In step S302, for one particular parameter, a plurality of flooding tests are performed, using a core flooding apparatus, by varying the one particular parameter from a lowest value in the operable range to a highest value, while keeping all other parameters at respective average values. In each of the flooding tests, a dissolving fluid is injected into the core flooding apparatus containing salt from an inlet. The salt is dissolved by the dissolving fluid, resulting in a brine that is removed from the core flooding apparatus through an outlet. A salt concentration and a volume of the brine are measured to estimate a salt mass of dissolved salt. Further, a mass of insoluble materials is calculated. The calculation on the mass of the insoluble materials may be used to analyze and improve the composition of the dissolving fluid, for example, the amount of chemical additives to be added to the dissolving fluid minimizing the insoluble materials. All the flooding tests for the one particular parameter are performed for a same duration.

In step S303, an analytical relationship between the salt mass and the one particular parameter is established by fitting a curve of the salt mass versus the one particular parameter at respective operable range, from the lowest value to the highest value.

In step S304, steps S302 and S303 are performed for each of the parameters. The flooding tests may be performed with varying flow rates, pressures, temperatures, angles, compositions, or other parameters. As a result, analytical relationships are obtained for each of the parameters.

In step S305, a total relationship between the salt mass of dissolved salt and all of the parameters is obtained by combining all the analytical relationships into one single equation. For example, when analytical relationships of three parameters are represented by $M_1=D_1*f(a)$, $M_2=D_2*g(b)$, and $M_3=D_3*h(c)$, respectively, the total relationship represented by one single parameter may be represented by $M=D*f(a)*g(b)*h(c)$, where $D=D_1*D_2*D_3$, M and $M_1-M_3$ represent salt masses of dissolved salt, D and $D_1$ to $D_3$ represent coefficients, and a, b, and c represent different parameters in respective operable range.

Once the total relationship is established, such equation may be used to estimate a salt mass of dissolved salt in salt cavern formation and construction, to predict the dissolution progress and/or a damage of salt mass under cyclic loading and evolution of the salt cavern in long term, and to better control the parameters for desired shape and size of salt caverns.

Example 1

Figure 4:
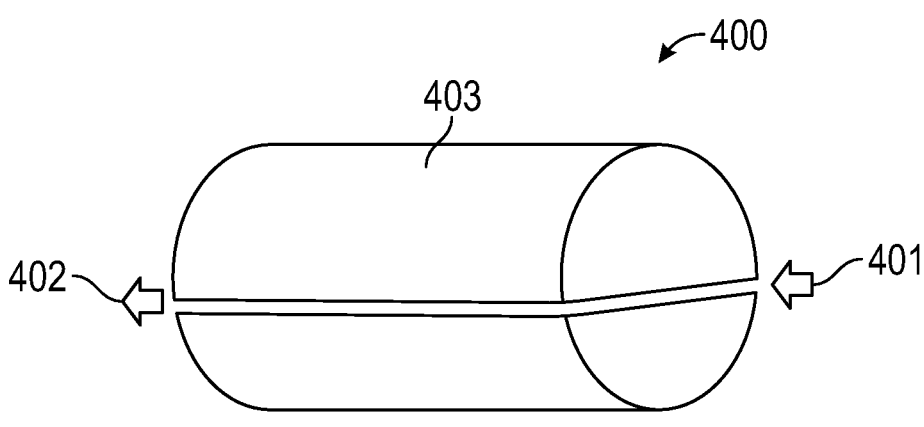
FIG. 4 shows a core flooding apparatus according to according to one or more embodiments.

FIGS. 4-7 show a non-limiting example of the present disclosure. The method in accordance with one or more embodiments may be performed using a core flooding apparatus shown in FIG. 4. The core flooding apparatus 400 comprises an inlet 401, an outlet 402, and a chamber 403 that accommodates a salt. A plurality of flooding tests were performed using the core flooding apparatus to estimate a dissolution progress under different parameters. The core flooding apparatus may be a commonly used flood test equipment known in the art. While a cylinder shape is shown in FIG. 4, such a configuration is not meant to be limiting, and any shape or size may be used. In each of the flooding tests, a dissolving fluid was injected into the core flooding apparatus through the inlet to dissolve at least a portion of the salt in the chamber, and the brine formed was removed through the outlet. The brine was collected, and a salt concentration in the brine was used to calculate a mass of dissolved salt.

Figure 5:
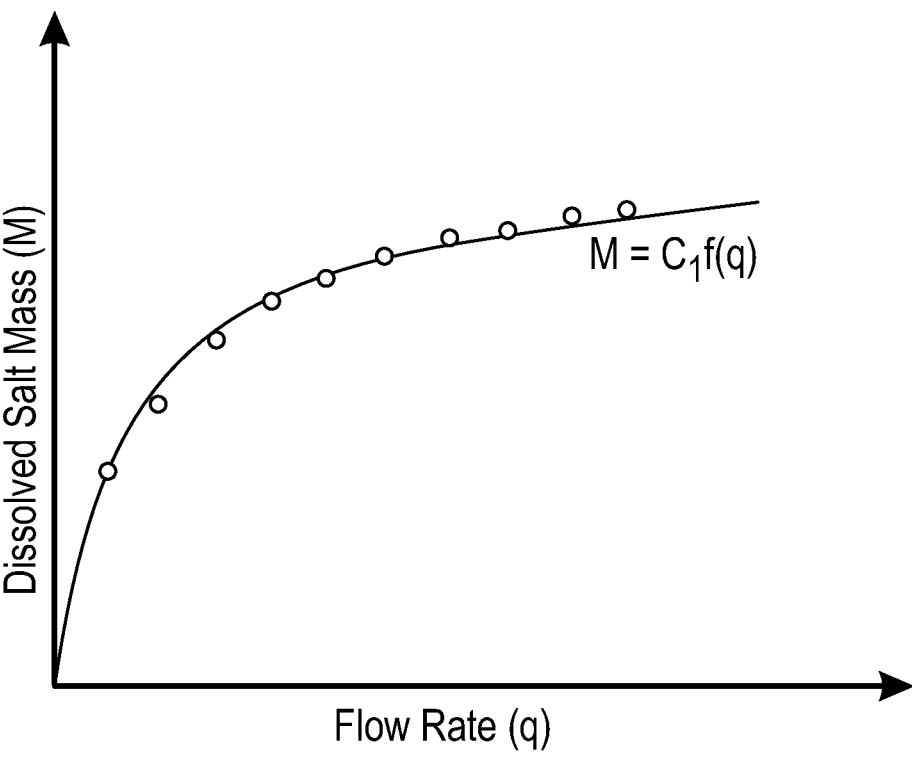
FIG. 5 shows a scheme of analytical relationship according to one or more embodiments.
Figures 6, 7:
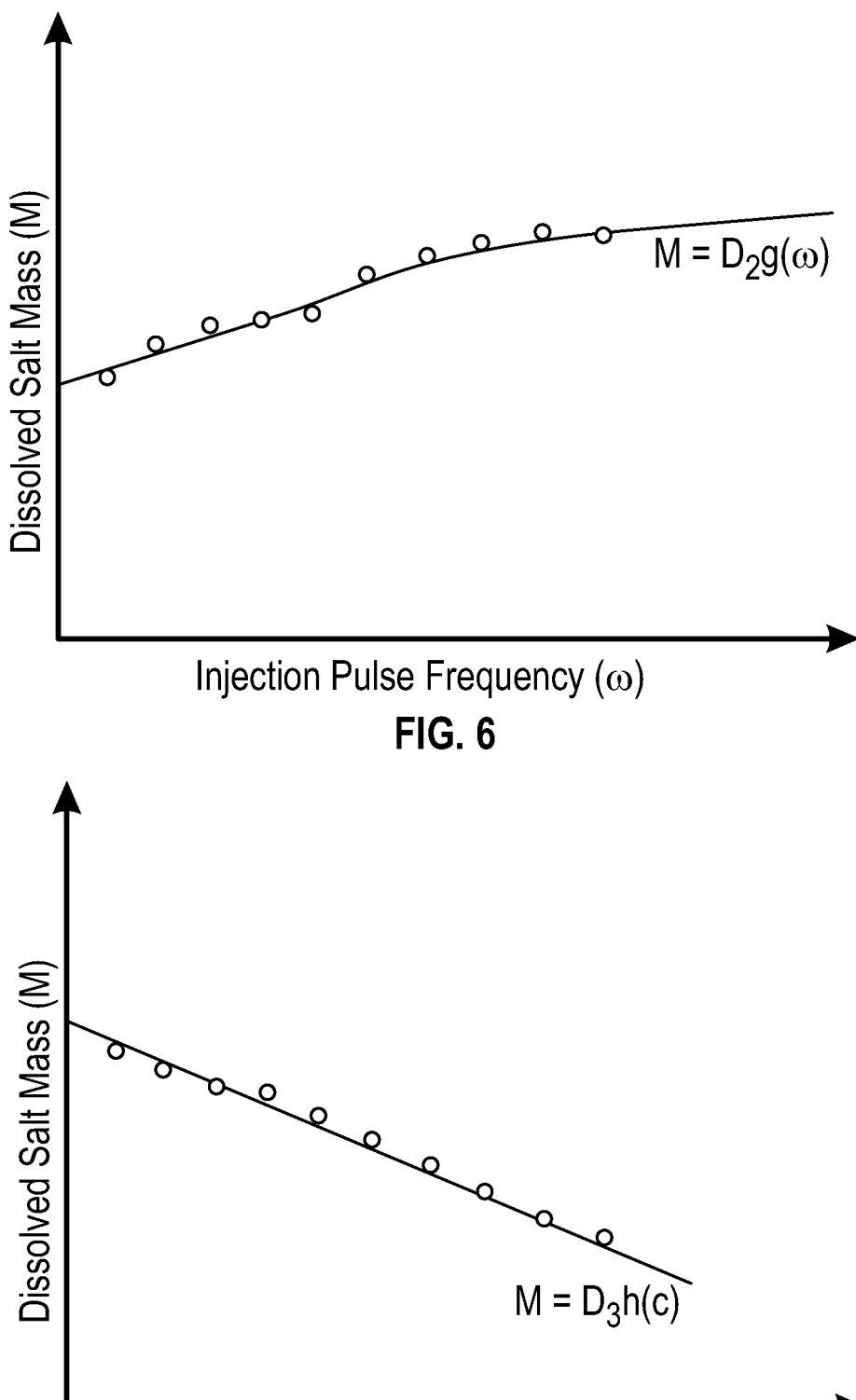
FIG. 6 shows a scheme of analytical relationship according to one or more embodiments.
FIG. 7 shows a scheme of analytical relationship according to one or more embodiments.

Three sets of tests were performed to study analytical relationships of the mass of dissolved salt versus three parameters: flow rate, injection frequency, and salt concentration of the dissolving fluid, and the results are shown in FIGS. 5-7, respectively. For each of the parameters, an operable range was predetermined, and an average value of the operable range was calculated. A first set of tests was performed by varying the flow rate of the dissolving fluid when injected into the core flooding apparatus, while the other two parameters were kept at respective average values. Ten values of the flow rate were selected from a lowest value of the operable range to the highest value. An analytical relationship was obtained by fitting a curve of the mass of dissolved salt versus varying flow rate and may be presented as $M_1=D_1*f(q)$. A duration of dissolution was kept the same for all the tests. A second set of tests was performed by varying an injection frequency of the dissolving fluid, while the other two parameters were kept at respective average values. Ten values of the injection frequency were selected from a lowest value of the operable range to the highest value. An analytical relationship was obtained by fitting a curve of the mass of dissolved salt versus varying injection frequency and may be presented as $M_2=D_2*g(\omega)$. A third set of tests was performed by varying a salt concentration of the dissolving fluid, while the other two parameters were kept at respective average values. Ten values of the flow rate were selected from a lowest value of the operable range to the highest value. An analytical relationship was obtained by fitting a curve of the mass of dissolved salt versus varying flow rate and may be presented as $M_3=D_3*h(c)$. A total relationship between the salt mass of dissolved salt and all of the parameters may be obtained by combining the analytical relationships into one single equation represented by $M=D*f(q)*g(\omega)*h(c)$, where $D=D_1*D_2*D_3$, M and $M_1-M_3$ represent salt masses of dissolved salt, D and $D_1$ to $D_3$ represent coefficients, and a, b, and c represent different parameters in respective operable range. The curve fitting of $M_1$, $M_2$, and $M_3$ may include a fitting model that is known in the art, such as polynomial functions, power-law functions, or machine learning algorithms.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of estimating dissolution progress of a salt in construction of a salt cavern, comprising:

defining, for each of a plurality of parameters, an operable range of respective parameter and an average value of the operable range of respective parameter;

performing a plurality of flooding tests, by varying one particular parameter among the plurality of parameters from a lowest value to a highest value in the operable range of the one particular parameter and keeping all other parameters at the average value of respective parameter;

wherein each of the flooding tests is performed by:

injecting a dissolving fluid into the salt disposed in a core flooding apparatus, producing a brine containing dissolved salt; and calculating the mass of the dissolved salt in the brine, obtaining an analytical relationship of a mass of dissolved salt versus the one particular parameter;

varying each of the parameters while keeping all other parameters at their average values to obtain a plurality of the analytical relationships for each of the parameters; and combining the plurality of the analytical relationships to obtain a total relationship between the mass of dissolved salt and all of the parameters, the parameters include flow rate, injection frequency, and salt concentration of the dissolving fluid.

2. The method according to claim 1, wherein the analytical relationship is obtained by fitting a curve of the flooding tests in the operable range of the one particular parameter.

3. The method according to claim 1, further comprises using the analytical relationship to estimate the dissolution progress of the salt.

4. The method according to claim 1, further comprising controlling a shape and/or a size of the salt cavern during the construction of the salt cavern by controlling at least one of an injection location, injection frequency, flow rate, and salt concentration of the dissolving fluid.

5. The method according to claim 1, wherein the plurality of parameters is selected from a group consisting of flow rate, temperature, pressure, injection frequency, and composition of a dissolving fluid.

6. A method for constructing a salt cavern, comprising:

injecting a dissolving fluid into a salt formation, producing a brine containing dissolved salt; and controlling a plurality of parameters during the injecting to control a shape and/or size of the salt cavern by controlling at least one of an injection location, injection frequency, flow rate, and salt concentration of the dissolving fluid, wherein each of the analytical relationships for respective parameter is obtained by:

defining, for each of the plurality of parameters, an operable range of respective parameter and an average value of the operable range of respective parameter;

performing a plurality of flooding tests, by varying one particular parameter among the plurality of parameters from a lowest value to a highest value in the operable range of the one particular parameter and keeping all other parameters at the average value of respective parameter;

wherein each of the flooding tests is performed by:

injecting a dissolving fluid into the salt disposed in a core flooding apparatus, producing a brine containing dissolved salt; and calculating the mass of the dissolved salt in the brine, obtaining an analytical relationship of a mass of dissolved salt versus the one particular parameter;

varying each of the parameters while keeping all other parameters at their average values to obtain a plurality of the analytical relationships for each of the parameters; and combining the plurality of the analytical relationships to obtain a total relationship between the mass of dissolved salt and all of the parameters, the parameters include flow rate, injection frequency, and salt concentration of the dissolving fluid.

7. The method according to claim 6, wherein the analytical relationship is obtained by fitting a curve of the flooding tests in the operable range of the one particular parameter.

8. The method according to claim 6, further comprises using the analytical relationships to estimate a dissolution progress of the salt.

* * * * *